United States Patent Office 3,532,751
Patented Oct. 6, 1970

3,532,751
SYNTHESIS OF 3-CHLORO-2-HYDROXYPROPYL QUATERNARY AMMONIUM SALTS
Ralph R. Langher, Lake Jackson, John C. Walling, Angleton, and Russell T. McFadden, Freeport, Tex., assignors to The Dow Chemical Company, Midland, Mich., a corporation of Delaware
No Drawing. Filed Jan. 10, 1967, Ser. No. 609,713
Int. Cl. C07c 85/00
U.S. Cl. 260—567.6                               1 Claim

ABSTRACT OF THE DISCLOSURE

Hypochlorination of allyl quaternary ammonium salts (III) in aqueous solution with chlorine at 0°–40° C. shown in Eq. 1 gives improved yields of the corresponding 3-chloro-2-hydroxypropyl derivatives (I) useful in preparing cationic esters and ethers.

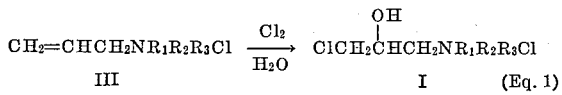

III                          I          (Eq. 1)

BACKGROUND

Preparation of cationic derivatives of polyhydroxy compounds such as starch and cellulose have received considerable recent attention. Particularly useful as an intermediate in the preparation of such cationic derivatives are 3-chloro - 2 - hydroxypropyl quaternary ammonium salts (I) or the corresponding epoxide (II).

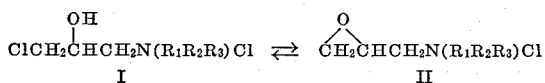

I                         II

The interconversion of the chlorohydrin and epoxide, depending particularly on the pH, is well established. To retain adequate water solubility or dispersibility essential for many applications such as paper manufacturing, a high purity intermediate is required. For many applications cross-linking by reactive polyfunctional impurities in the chlorohydrin or epoxide is highly undesirable.

Two general syntheses for the intermediate quaternary ammonium salts were recognized prior to 1900, e.g. (a) reaction of epichlorohydrin with a tertiary amine and (b) hypochlorination of an allyl quaternary ammonium salt. These syntheses were generally believed to be equivalent. Schlack in U.S. Pat. 2,131,120 recognized the general utility of these quaternary ammonium salts as a synthetic intermediate. Because of the commercial availability of epihalohydrin, the first synthesis has generally been preferred. However, as Paschell described in U.S. Pat. 2,876,217 careful purification of the epichlorohydrin derivatives is required to remove unreacted epichlorohydrin and other reactive by-products to a level where starch treated with this product remained gelatinizable in hot water. Because of these purification problems, the intermediate chlorohydrins (I) prepared by hypochlorination of the allyl quaternary ammonium salt (III) has as shown by French Pat. 1,428,534, received renewed attention.

SUMMARY OF THE INVENTION

It has now been discovered that under certain conditions improved yields and conversions can be obtained in the hypochlorination of an allyl quaternary ammonium salt. The improvement comprises treating an aqueous mixture of the allyl salt at 0°–40° C. for a time sufficient to achieve hypochlorination. Preferably the reactants mixture is an aqueous solution containing 5–25 weight percent of a water-soluble allyl quaternary ammonium salt. Higher concentrations favor the formation of chlorination products. The hypochlorination is carried out in a continuous reactor with a contact time of 1 to 10 minutes, preferably 3 to 5 minutes. By this process a 91 percent yield of 3-chloro-2-hydroxypropyl trimethyl quaternary ammonium chloride is readily obtained in contrast to the 70 percent yield described in French Pat. 1,428,534. The resulting aqueous product mixture can be used directly to esterify a polyacrylate or etherify cellulose or starch. The smaller amount of by-product 2,3-dichloropropyl salts does not react with the polyhydroxy compounds under normal conditions.

DESCRIPTION OF THE INVENTION

As shown in Equation 1,

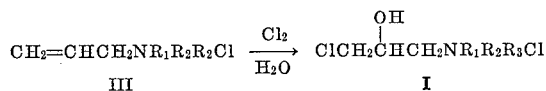

III                        I the hypochlorination process involves addition of chlorine to an aqueous solution or dispersion of an allyl quaternary ammonium salt (III). The improvement requires the use of a water-soluble or highly water dispersible allyl quaternary ammonium salts in conjunction with a slight excess of chlorine and a controlled reaction temperature of 0°–40° C.

Particularly suitable are allyl quaternary ammonium salts of the formula

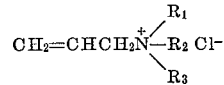

wherein $R_1$ is a $C_1$–$C_2$ alkyl or hydroxyalkyl group;
$R_2$ is a $C_1$–$C_2$ alkyl group or an ethylenoxy group of the formula $-(C_2H_4O)_aH$ wherein $a$ is an integer from 1–10; and
$R_3$ is a $C_1$–$C_{25}$ alkyl, substituted alkyl, alkylene, alkylenoxy, alkaryl, or aralkyl group; or in combination with $R_2$ a morpholine, pyrrole, pyrrolidine or piperidine group.

Such quaternary allyl salts can be prepared by reaction of an allyl halide, preferably allyl chloride, with an appropriate tertiary amine such as trimethyl amine, dimethylbenzyl amine, dimethylethanol amine, dimethyl lauryl amine, N,N-dymethylcyclohexylamine, dimethylanaline N-methyl morpholine, dimethyl arachidyl amine, and such commercial mixed amines as Armene DML–15D, Armene DML–11D, Ethomeen L–11/25, Ethomeen L–15/15 from Armour Industrial Chemical Company. Particularly suitable are the very water soluble dimethyl alkyl or aryl allyl quaternary ammonium salts. As prepared from allyl chlorides, the salts are normally in the chloride form more suitable for hypochlorination.

To achieve a high yield of the desired hypochlorination product, control of the reaction temperature is most critical. Since chlorination to form the undesired 2,3-dichloropropyl derivatives becomes rapid above 40° C., a hypochlorination temperature of 0°–40° C., and preferably 0–25° C. is essential. This requires rapid mixing of the reactants, particularly near the chlorine inlet and the effective cooling. These conditions are quite readily achieved using a continuous, water-cooled, vertical reactor filled with an inert packing and having a bottom chlorine inlet. The allyl salts, preferably as a 5–25 weight percent aqueous solution, can be fed to flow either concurrently or countercurrently to the chlorine feed. The flow rates are adjusted to maintain a slight excess of chlorine as shown by its characteristic yellow-green color. At 0°–40° C. hypochlorination is rapid and with a 5–25 weight percent aqueous solution of the allyl salt is essentially complete with a contact time of about 1 to 10 minutes. Alternately hypochlorination can be achieved by bubbling chlorine into a well stirred and cooled aqueous solution or dispersion of the allyl salt.

In either a batch or continuous process, a slight excess of chlorine is essential for high yields. About 1.05–2.00 and preferably about 1.1–1.4 moles of chlorine are added per mole of allyl salt. A higher excess of chlorine is not advantageous. Since this hypochlorination occurs under acidic conditions, e.g., at a pH less than 6.5, neutralization of the by-product HCl is not required during the hypochlorination process. When the hypochlorination is essentially complete, the aqueous product mixture can be purged with an inert gas if necessary to remove excess dissolved chlorine. The aqueous product is normally neutralized with sodium hydroxide or a basic ion-exchange resin to a pH of about 6.5–7.0 prior to concentration or use as an intermediate.

The following examples further illustrate the present invention. Unless otherwise stated, all parts and percentages are by weight.

EXAMPLE 1

Synthesis of 3-chloro-2-hydroxypropyltrimethylammonium chloride (A) To a stirred solution of 182 kg. (3.07 moles) trimethylamine in 212 kg. water in a water-cooled kettle was gradually added 232 kg. (3.02 moles) allyl chloride. The reaction temperature was held below 45° C. during the addition. After stirring another hour a vacuum was pulled for 3 hours to remove any unreacted allyl chloride and trimethylamine. The resulting aqueous 65% solution of allyltrimethylammonium chloride contained 16.4% ionic chloride (calcd.: 16.7% Cl−) and less than 100 p.p.m. allyl chloride.

(B) 45.4 kg. of the aqueous 65% solution of allyltrimethylammonium chloride (0.22 mole) was diluted to a 10.4% solution with water and fed into a jacketed 7.5 cm. x 300 cm. cylindrical glass tower mounted vertically and packed with 1.2 cm. Raschig rings. Simultaneously anhydrous chlorine was fed to the column at such a rate that a slight excess of chlorine was always present as shown by its yellow-green color. The reaction temperature was maintained between 15°–25° C. by circulation of cooled brine in the column jacket. The column effluent was collected in a glass-lined kettle. A total of 18.2 kg. (0.26 mole) chlorine or 1.17 moles per mole of allyltrimethylammonium chloride was used during the run which required about 3 hours. The average contact time in the column was about 5 minutes.

Excess chlorine and HCl gas was stripped from the product solution under vacuum and then it was neutralized to pH 6.8 with 28.5 kg. of 30% aqueous NaOH (0.21 mole). A portion of this product solution was concentrated in a vacuum evaporator to about 88% dissolved solids and then filtered to remove precipitated NaCl. The final product solution contained 12.3% water. Its analysis on a dry weight basis was as follows:

|  | Percent | |
| --- | --- | --- |
|  | Calcd. | Found |
| Total chloride | 37.6 | 39.2 |
| Ionic chloride | 18.8 | 19.8 |
| Nitrogen | 7.45 | 8.0 |
| Chlorohydrin ($C_2H_4OCl$) | 42.2 | 38.3 |
| Epoxide ($C_2H_3O$) | 0 | 0.2 |

It contained less than 100 p.p.m. allyl chloride, epichlorohydrin, 1,3-dichloro-2-propanol and a residual unsaturation of less than 0.2%. Based on the chlorohydrin content corrected for the small amount of epoxide, the yield of 3-chloro-2-hydroxy-propyltrimethylammonium chloride was 91%.

EXAMPLE 2

Hypochlorination process variables (A) Another portion of the 65% allyltrimethylammonium chloride solution of Example 1A was diluted to a 20% aqueous solution and hypochlorinated as described in Example 1B at 15°–20° C. using 1.82 moles of chlorine/mole of allyltrimethylammonium chloride with an average contact time of 3–5 minutes. The product solution after stripping excess chlorine and neutralizing with NaOH was found to contain less than 100 p.p.m. of epichlorohydrin and 1,3-dichloro-2-propanol and a 91% yield of 3-chloro-2-hydroxy-proplytrimethylammonium chloride.

(B) In another run a 10.4% solution of allyltrimethylammonium chloride prepared as in Example 1B was hypochlorinated in the continuous reactor described in Example 1B at 15°–25° C. using only 1.06 moles chlorine/mole allyl salt. The resulting product on a dry weight basis contained only 33.3% total chloride (88% of theor.) and had a chlorohydrin content of 33.0% corresponding to a 77% yield of the desired 3-chloro-2-hydroxypropyltrimethylammonium chloride. In general at least a 10% excess of chlorine e.g. 1.10 moles, is required for high yields of the hypochlorination product by this improved process.

(C) Another 50 kg. of the 65% allyl salt solution of Example 1A was diluted with water and hypochlorinated as described in Example 1B using about 1.2 moles $Cl_2$/mole allyl salt and an average contact time of about 3–5 minutes. The column effluent was blown with air to remove excess chlorine and HCl and then neutralized by passing through a bed of weak base ion-exchange resin. The resulting solution contained a 90% yield of the desired chlorohydrin.

EXAMPLE 3

Batch hypochlorination

To 708 g. (3.0 moles) of 25% aqueous trimethylamine was added at 35–40° C. with stirring 252 g. (3.30 mole) of allyl chloride. When the reaction exotherm subsided, the excess allyl chloride was rapidly stripped under reduced pressure to give a clear aqueous solution containing about 43% allyltrimethylammonium chloride.

Chlorine gas was then bubbled into the aqueous solution while maintaining a temperature of 35–40° C. until an excess was present as shown by the appearance of a greenish color. About 1.1–1.3 moles of chlorine was added per mole of allyl salt. The solution was stripped of HCl and excess $Cl_2$ at 60° C./20 mm. Hg and then neutralized with NaOH to a pH of about 6.5.

Based on its chlorohydrin analysis, the aqueous product solution contained about an 85% yield of 3-chloro-2-hydroxypropyltrimethylammonium chloride. A significant amount of by-product 2,3-dichloropropyltrimethylammonium is indicated by a high total organic chlorine content of 23.7% (calcd. 18.9%) of the product.

The competition of hypochlorination and chlorination has been found to vary in a nearly linear fashion with temperature in the range from about 30–50° C. To achieve high yields of the hypochlorination product, the reaction temperature should be maintained below 40° C.

EXAMPLE 4

Hypochlorination of other allyl quaternary ammonium salts (A) To 1250 parts (16.3 moles) of refluxing allyl chloride was added dropwise 534 parts (6.0 moles) of dimethylethanolamine over 5 hours. The insoluble solid quaternary salt was recovered by filtration, washed with methylenechloride and dried. Then it was dissolved in 7000 parts water. The resulting solution was fed through a precooler where it was cooled to about 5° C. into the bottom of a water-cooled 2.5 cm. dia. by 92 cm. glass column packed with 0.6 mm. Raschig rings. At the same time chlorine was also fed into the bottom at a rate such that a slight excess chlorine was present in the exit product stream at the top of the column. The temperature of the exit stream was about 5–10° C. The average contact time was about 5 minutes and about 1.1–1.2 moles of $Cl_2$ were fed per mole allyl salt. Excess chlorine was stripped under vacuum and the pH adjusted to about 6.5 with NaOH. The resulting aqueous solution contained about 40% active solids and had a chlorohydrin analysis of 14.7% as $C_2H_4OCl$.

(B) Allyldimethylbenzylammonium chloride was prepare by reacting dimethylbenzyl amine with excess allyl chloride in the presence of hexane as a diluent. The crude solid product was purified by dissolving in water and extracting unreacted amine with methylene chloride. The resulting solution containing about 10% of the allyl salt was fed at a rate of about 50 ml. per min. through the hypochlorinator described in Example 4A. The reaction temperature was held at about 5–7° C. The aqueous product solution was concentrated under reduced pressure at 50–60° C. and then neutralized to about pH 6.5 with NaOH. The final aqueous product solution contained about 42% active solids and had a chlorohydrin analysis of 12.7% as $C_2H_4OCl$.

(C) A series of allyl quaternary ammonium salts were prepared from commercially available tertiary amines using the following general procedure. About 50 parts (0.1–0.3 mole) of the amine was mixed at room temperature with about 94 parts (1.2 moles) of allyl chloride in a citrate bottle. The excess allyl chloride was used as a solvent. After standing an hour at room temperature, the bottle was capped and heated at 80° C. for about 16 hours. Then the excess allyl chloride was stripped under reduced pressure and the allyl quaternary ammonium salt dissolved or dispersed in 500 parts of water. The aqueous mixture containing about 10% of the allyl salt was cooled with stirring to about 5° C. Then chlorine was added gradually through a sparger while maintaining a reaction temperature of 5–10° C. The addition of chlorine was continued until the solution had a permanent yellow-green color. Then to remove the HCl, the solution was mixed with excess weak-base ion-exchange resin (Dowex 44 resin) and then filtered.

Chlorohydrin analyses for a number of typical quaternary ammonium salts prepared by this procedure are given in Table 1.

TABLE 1.—3-CHLORO-2-HYDROXYPROPYL QUATERNARY AMMONIUM SALTS

| No. | Tertiary amine | Percent $H_2O$ | $C_2H_4OCl$ |
| --- | --- | --- | --- |
| 4A-1 | Armene DML-15D a | 53.5 | 5.6 |
| 4A-2 | Armene DML-11D a | 85.2 | 2.2 |
| 4A-3 | Ethomeen L-11/25 b | 85.7 | 1.4 |
| 4A-4 | Ethomeen L-15/15 b | 80.2 | 1.3 |
| 4A-5 | N-methylmorpholine | 74.8 | 6.9 | a Tertiary dimethyl $C_{15}$-$C_{20}$ and dimethyl $C_{11}$-$C_{14}$ amines from Armour Industrial Chemicals.
b Tertiary amines containing 1 fatty $C_{11}$-$C_{14}$ or $C_{15}$-$C_{20}$ group and two polyoxyethylene groups with a total of 15 or 5 oxyethylene groups attached to the nitrogen from Armour Industrial Chemicals.

EXAMPLE 5

Preparation of cationic starch

The improved properties of the 3-chloro-2-hydroxypropylammonium salt prepared by the hypochlorination process, as an intermediate in the preparation of cationic derivatives are shown in the following experiments.

(A) Hypochlorination product as intermediate: A sample of the 3-chloro-2-hydroxypropyltrimethyl ammonium chloride from Example 1 was epoxidized by stirring at room temperature for 10 minutes with a slight excess of dilute NaOH. The solution pH was then adjusted to 8.2.

A portion of the aqueous epoxide solution containing about 47.6 millimoles of the quaternary epoxide was added to a slurry of 180 g. of granular starch with 300 g. of water containing 20 g. NaCl and 4 g. NaOH. The slurry was heated at about 47° C. for 7 hours and then cooled. The pH was adjusted to 6.3 with dilute HCl and the insoluble cationic starch recovered by filtration. On a dry weight basis it contained 0.263% nitrogen.

A 1.25 g. sample of dry weight of this catiinic starch dispersed rapidly in 200 g. of water and dissolved after heating about 15 minutes. On cooling smooth gelation occurred.

(B) Epichlorohydrin product as intermediate: Following the procedure of Paschall, U.S. 2,876,217, Example 4, 75.5 g. (0.82 mole) if epichlorohydrin, 200 g. (0.84 mole) of aqueous 25% trimethylamine and 200 g. of water were stirred for 3 hours at room temperature. During the initial reaction cooling was necessary to keep the reaction temperature below 50° C. The resulting solution contained 73.5% water, 2.26% epichlorohydrin, 0.98% 1,3-dichloro-2-propanol ,and 23.3% 2,3-epoxypropyltrimethylammonium chloride as calculated from an epoxide content of 6.4% as $C_2H_3O$.

To remove the undesired epichlorohydrin and 1,3-dichloro-2-propanol, the aqueous product was concentrated at 25–30° C. and 10–30 mm. Hg for 6 hrs. yielding a viscous solution containing 35.6% water and less than 100 p.p.m. epichlorohydrin and 1,3-dichloro-2-propanol. It had a total nitrogen content of 9.4% and a reduced epoxide content of 5.1%, on a dry weight basis.

A portion of this quaternary epoxide was added to a starch slurry as described in Example 5A. The resulting cationic starch contained 0.126% N. When dissolved in hot water it gave a solution which did not gel on cooling, indicating excessive cross-linking.

We claim:

1. In a process for preparing 3-chloro-2-hydroxypropyl trimethyl ammonium chloride by hypochlororination of allyl trimethyl ammonium chloride, the improvement which comprises: treating an aqueous solution containing about 5–25 weight percent allyl trimethyl ammonium chloride with 1.05–2.00 moles of chlorine per mole of ammonium salt at 0°–40° C.

References Cited

UNITED STATES PATENTS

| 2,131,120 | 9/1938 | Schlack. | |
| 3,017,294 | 1/1962 | Meisel. | |
| 2,876,217 | 3/1959 | Paschall | 260—233.3 |
| 3,346,563 | 10/1967 | Shildneck et al. | 260—233.3 |

FOREIGN PATENTS 1,428,534  1/1966  France.

OTHER REFERENCES

Reboul: Compt. rend., 93, pp. 423–4 (1881).
Partheil: Ann., 268, pp. 191–2 (1892).
Schmidt: Ann., 337, p. 44 (1904).
Schmidt: Justus Liebigs Annalen der Chemie, 44, p. 337 (1904).

BERNARD HELFIN, Primary Examiner

G. A. SCHWARTZ, Assistant Examiner

U.S. Cl. X.R.

117—152; 260—233.3